United States Patent Office 3,409,908
Patented Nov. 12, 1968

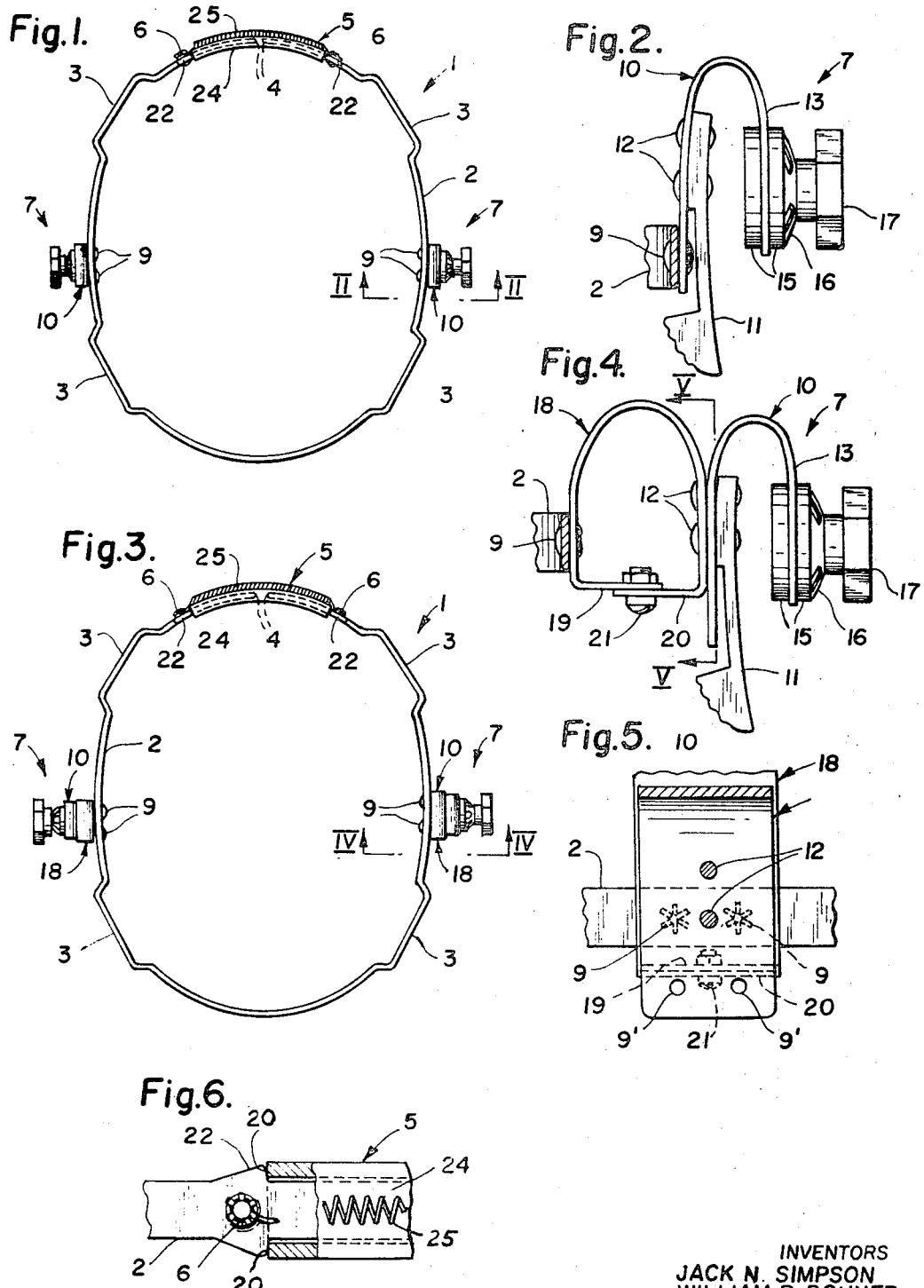

3,409,908
ATTACHMENT FOR MOUNTING A FACE PROTECTIVE SHIELD ON A SAFETY HAT
Jack N. Simpson and William R. Bohner, Reading, and Palmer E. Brace, Mohnton, Pa., assignors to ESB Incorporated, a corporation of Delaware
Filed July 18, 1966, Ser. No. 566,134
1 Claim. (Cl. 2—3)

ABSTRACT OF THE DISCLOSURE

A headband for detachably supporting a face protecting shield on a safety hat or cap, which headband includes a pair of depending hooks secured to looped strips on opposite sides of the headband wherein the loops are of adjustable size for varying the spacing between the hooks.

This invention relates to improvements in headgear assemblies for mounting face-protective elements, such as welding helmets, goggles, face-shields, etc., and, more particularly, to improvements for the purpose of providing quick detachability and attachability to either a safety cap or hat. This invention is an improvement over that shown in Patent No. 3,214,768 assigned to the present assignee.

The combination of a welding shield and safety cap is known in the art, however, one outstanding disadvantage of such combination as conventionally used has been that the welding shield is fastened to the cap by fastening means, such as screws and the like, which involves a certain amount of difficulty and the use of both hands for either attaching the welding shield to the safety cap or hat or detaching it therefrom, as well as requiring appreciable time for such connection or disconnection. This is undesirable because the welder usually has an electrode holder or other equipment in one hand and has frequent necessity of removing the shield or attaching it to the safety cap during intermittent welding operations. Therefore, in the conventional combination it would be necessary for him to lay down the welding torch and then use both hands for applying the screws or other fastening elements for attaching the welding shield to the cap or hat. Because of this inconvenience, many times the shield is not worn when it should be, therefore exposing the workman to a great danger.

A disadvantage of the abovementioned construction as shown in said patent is that it is not suitable for safety hats, as distinguished from safety caps, also it does not become anchored sufficiently to prevent some turning about the band portion of the hat, particularly when projections extent outwardly from such band portion.

An object of the present invention is to provide a novel attachment for detachably mounting a face protective shield, or the like, on a safety hat in a manner so as to overcome the abovementioned disadvantages.

A more specific object of the present invention is to provide, in the band portion of a face protective attachment for a safety hat, means for preventing rotation of the attachment about the band portion, as well as means for providing radially outward spacing means between the clips and band to provide easy and quick attachment to hats of varying shapes and sizes.

Other objects and advantages will become more apparent from a study of the following description taken with the accompanying drawing wherein:

FIG. 1 is a plan view of a safety cap attachment embodying one of the features of the present invention;

FIG. 2 is an enlarged, cross-sectional view taken along line II—II of FIG. 1;

FIG. 3 is a plan view of a modified attachment suitable for safety hats;

FIG. 4 is a cross-sectional view taken along line IV—IV of FIG. 3;

FIG. 5 is a vertical, cross-sectional view taken along line V—V of FIG. 4; and,

FIG. 6 is an enlarged, fragmentary view, partly in cross-section as viewed from the rear portion of the strap 2 shown in FIGS. 1 and 3, that is, as viewed from the top portion of FIGS. 1 and 3.

Referring more particularly to FIGS. 1 and 2 of the drawing, an attachment is shown which is suitable for safety caps and is denoted generally by numeral 1. The attachment comprises a flexible strap 2 bent into somewhat oval shape and having a plurality of radially outwardly extending projections 3 of substantially U-shape which are adapted to correspond in shape to the outer rim surface of certain types of safety hats and caps which have outward projections for providing inner wells for accommodating anchoring means on the inside, such as shown in Design Patent 198,776, dated Aug. 4, 1964. By snugly fitting projections 3 so as to closely fit the outer projections of the cap or hat, strap 2 will be very securely anchored to the rim portion and relative rotation of the strap circumferentially of the rim portion of the hat or cap is prevented.

At the rear end portion of the strap 2 there is provided a tube 5 which closely encircles the abutting end portions 4 of strap 2 as shown more clearly in FIG. 6. Helical spring 25 has its ends connected by rivets 6 to portions 22 of the strap 2, which portions have shoulders 20 serving as stop elements which abut against the ends of tube 5. Thus spring 25 constantly urges the ends 4 of strap 2 into abutting engagement except when the strap is pulled so as to separate the ends 4 against the resistance or action of spring 25 so as to yieldingly clamp the strap 2 tightly against the rim portion of the safety cap.

FIG. 2 shows the detachable clip construction, denoted generally by numeral 7, comprising a clip or latch 11 mounted by rivets or other suitable fastening means 12 to an inverted U-shape strap 10 having one end portion secured by fastening means 9, such as rivets, to the strap 2. The other end portion 13 has mounted thereon fastening means 15, spring washer 16 and a nut 17 which is internally screw threaded to a threaded and flattened stud portion integrally formed on the head in the manner shown in more detail in U.S. Patent 3,060,444 and forming, per se, no part of the present invention. Since clip 11 has a ledge portion vertically underneath strap 2, it would not be suitable for clipping onto a safety hat as distinguished from a safety cap.

FIGS. 3, 4 and 5 show a modification of the attachment which has parts which are identical to those in FIGS. 1 and 2, bearing the same numerals, and, in addition, have other parts, such as the strap 18 bent into a closed loop by overlapping the end portions 19 and 20 and bolting them together by bolt 21. Either a plurality of holes may be provided in the portions 19 and 20 to provide selective insertion of bolt 21 in one or more registering holes, or a slot may be provided in either or both of portions 19 and 20 to vary the distance between clip 11 and strap 2. Preferably, end portions 19 and 20 are overlapped by the desired amount and riveted together.

Thus it will be seen that suitable spacing or separation exists between clip 11, which anchors to the bottom edge of the brim of the hat, and strap 2 which snugly engages the band portion of the hat. Additional vertical adjustment of clip 11 may be provided, if desired, by providing additional registering holes in the end portion of strap 10, or better still, by riveting the rivets 12 to a lower or higher portion of straps 10 and 18 than that shown.

The looped strap 18 not only provides accurate separation between the clip 11 and strap 2, but provides a certain amount of flexibility so as to facilitate outward tensioning of the latch 11 to clear the bottom edge of the safety hat immediately before attachment thereto by the springiness of the latch 11 as well as that of straps 10 and 18.

All of the above described parts, other than the fastening means, may be made of polypropylene or other suitable plastic material or perhaps even metal or other suitable, flexible material.

Thus it will be seen that we have provided an efficient attachment for easily and quickly mounting a face protective shield, welding helmet or goggles on a safety hat and securing the hat by clipping onto the bottom edge portion of the hat; furthermore we have provided an attachment that can be securely fastened to the band portion of a safety hat or cap, even of the type having radially outward projections, whereby the strap will not move circumferentially on the hat; furthermore, we have provided a clip assembly which provides adjustable separation of the clip from the hatband-surrounding portion of the attachment and which is adjustable both vertically and radially therefrom to accomodate different shapes and sizes of safety hats.

While we have illustrated and described several embodiments of our invention, it will be understood that these are by way of illustration only, and that various changes and modifications may be made within the contemplation of our invention and within the scope of the following claim.

We claim:

1. In combination with a safety hat having a band portion with spaced, outwardly extending projections and an outwardly flared brim portion having a bottom edge, a face protecting shield, a headband supporting said face protecting shield, said headband comprising a strip of substantially oval shape with abutting ends, a pair of spacing elements connected to opposite, outside surfaces of said headband, a pair of clips attached to opposite sides of the inner surface of said shield and to opposite outside portion of said elements, said headband including spring means yieldably holding said ends in abutting relationship, a pair of hooks having flexible shank portions secured to said clips and having downwardly and inwardly extending hook portions at the ends of said shank portions in confronting relationship and extending below said bottom edge and constituting the sole means to hold said headband downwardly, whereby the headband is clamped onto the headgear solely by the tension of said spring means and held tightly thereto by latching of said hook portions to said bottom edge of said safety hat brim portion, so that the user may, by springing apart said hook portions, flex said shank portions sufficiently to enable said hook portions to clear said bottom edge and detach the headband and shield from said safety hat, said brim portion serving as a stop to limit downward movement of said headband, each of said spacing elements constituting a strip in the form of a loop with overlapping and joined end portions, adjusting means for adjusting the extent of overlap of said end portions whereby the radial spacing between the headband and hooks may be varied.

References Cited

UNITED STATES PATENTS

| | | | |
|---|---|---|---|
| 2,167,969 | 10/1967 | Bowers | 2—8 |
| 3,075,201 | 1/1963 | Lindblom | 2—8 |
| 3,060,444 | 10/1962 | Hoffmaster et al. | 2—8 |
| 3,214,768 | 11/1965 | Bohner | 2—10 |

JORDAN FRANKLIN, *Primary Examiner.*

J. R. BOLER, *Assistant Examiner.*